US012577468B2

(12) United States Patent
Liu et al.

(10) Patent No.: US 12,577,468 B2
(45) Date of Patent: Mar. 17, 2026

(54) THERMOPLASTIC COMPOSITIONS AND USES THEREOF

(71) Applicant: SHPP GLOBAL TECHNOLOGIES B.V., Bergen op Zoom (NL)

(72) Inventors: Wenhao Liu, Shanghai (CN); You Jun Wu, Shanghai (CN); Siguang Jiang, Shanghai (CN); Zheng Wang, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 141 days.

(21) Appl. No.: 18/284,581

(22) PCT Filed: Apr. 1, 2022

(86) PCT No.: PCT/IB2022/053069
§ 371 (c)(1),
(2) Date: Sep. 28, 2023

(87) PCT Pub. No.: WO2022/214927
PCT Pub. Date: Oct. 13, 2022

(65) Prior Publication Data

US 2024/0191137 A1 Jun. 13, 2024

(30) Foreign Application Priority Data

Apr. 5, 2021 (EP) .................................... 21166867

(51) Int. Cl.

| | |
|---|---|
| ***C09K 19/38*** | (2006.01) |
| ***C08L 67/03*** | (2006.01) |
| ***C08L 67/04*** | (2006.01) |
| ***C09K 19/54*** | (2006.01) |

(52) U.S. Cl.
CPC .......... *C09K 19/3809* (2013.01); *C08L 67/03* (2013.01); *C08L 67/04* (2013.01); *C09K 19/542* (2013.01); *C08L 2205/03* (2013.01); *C09K 2019/548* (2013.01)

(58) Field of Classification Search
CPC ...................................................... C09K 19/38
See application file for complete search history.

(56) References Cited

U.S. PATENT DOCUMENTS

| | | | | |
|---|---|---|---|---|
| 5,135,990 | A | 8/1992 | Bookbinder | |
| 5,366,663 | A * | 11/1994 | Romer | C08L 67/00 525/425 |
| 5,633,319 | A * | 5/1997 | Silvi | C08L 79/08 525/425 |
| 8,853,344 | B2 | 10/2014 | Kim et al. | |
| 9,074,133 | B2 | 7/2015 | Nair et al. | |
| 2014/0183420 | A1* | 7/2014 | Kamoi | G03G 15/0189 264/105 |

FOREIGN PATENT DOCUMENTS

| | | | |
|---|---|---|---|
| JP | 2004175995 | A | 6/2004 |
| JP | 2007197714 | A | 8/2007 |
| JP | 2014130215 | A | 7/2014 |
| JP | 2017214460 | A | 12/2017 |
| WO | 0220698 | A1 | 3/2002 |

OTHER PUBLICATIONS

Japan Office Action issued Nov. 26, 2024 for corresponding Japan Patent Application No. 2023-560984, with English translation, 16 pages.
International Search Report and Written Opinion for the corresponding International Application No. PCT/IB2022/053069, International Filing Date: Apr. 1, 2022; Date of Mailing: Oct. 26, 2022; 11 pages.

* cited by examiner

*Primary Examiner* — Chanceity N Robinson
(74) *Attorney, Agent, or Firm* — CANTOR COLBURN LLP

(57) ABSTRACT

A composition includes particular amounts of a liquid crystalline polymer; a thermoplastic polymer including a polyetherimide, a polyarylate, or a poly(arylene ethersulfone); and a compatibilizer including a polyepoxy compound or a poly(ester-carbonate). Methods for the manufacture of the compositions and articles including the composition are also provided.

9 Claims, No Drawings

THERMOPLASTIC COMPOSITIONS AND USES THEREOF

CROSS-REFERENCE TO RELATED APPLICATIONS

This application is a National Stage application of PCT/IB2022/053069, filed Apr. 1, 2022, which claims priority to and the benefit of European Patent Application No. 21166867.8, filed on Apr. 5, 2021, the contents of both of which are incorporated by reference herein in is their entirety.

BACKGROUND

This disclosure relates to compositions including a liquid crystalline polymer, a thermoplastic polymer component, and a compatibilizer, as well as methods for the manufacture of the compositions, uses, and articles containing the compositions.

Liquid crystalline polymers can provide a desirable combination of properties for a wide variety of applications. For example, films derived from liquid crystalline polymers can provide a barrier to oxygen and moisture, rendering them effective for use in packaging applications. Films formed from liquid crystalline polymers are also attractive for use in circuit board applications due to their stability and good dielectric properties, such as low dissipation factor at a broad frequency range. Despite exhibiting many desirable properties, the use of liquid crystalline polymers can be limited by a lack of adequate melt strength and poor processability. Liquid crystalline polymers can have narrow processing windows, and films formed from liquid crystalline polymers can have poor tear strength in the machine direction, as well as low yield during film making and assembly processes.

In an effort to address the technical limitations of liquid crystalline polymers, combining high and low molecular weight liquid crystalline polymers has been explored, for example as in U.S. Pat. No. 8,853,344. Alternatively, a reactive oligomer has been introduced during synthesis of the liquid crystalline polymer, for example as in U.S. Pat. No. 9,074,133. These approaches rely on modifications during synthesis of the liquid crystalline polymer, either with a need for adding a solid-state polymerization step or by requiring excellent control over the reaction kinetics with the introduction of a multifunctional reactive species.

Accordingly, there remains a need in the art for liquid crystalline polymer compositions having improved melt strength and an improved processing temperature window. It would be a further advantage if the above-described technical limitations associated with the use of liquid crystalline polymers could be addressed without altering the synthesis of the liquid crystalline polymer, which can be costly and undesirable.

SUMMARY

Provided is a composition comprising 55 weight percent to 99.5 weight percent of a liquid crystalline polymer; 0.5 weight percent to 45 weight percent a thermoplastic polymer comprising a polyetherimide, a polyarylate, or a poly(arylene ether-sulfone); wherein weight percent is based on the total weight of the liquid crystalline polymer and the thermoplastic polymer; and 1 part by weight to 60 parts by weight of a compatibilizer comprising a polyepoxy compound or a poly(ester-carbonate), based on the total weight of the thermoplastic polymer.

Also provided is a method of making the composition, the method comprising melt-mixing the components of the composition, and optionally extruding the composition.

Also provided is an article comprising the composition.

The above described and other features are exemplified by the following detailed description.

DETAILED DESCRIPTION

Provided herein is a composition having a particular combination of rheological properties and dielectric properties. The compositions include particular amounts of a liquid crystalline polymer, a thermoplastic polymer comprising a polyetherimide, a polyarylate, or a poly(arylene ether-sulfone), and a compatibilizer.

Accordingly, a composition represents an aspect of the present disclosure. The composition comprises a liquid crystalline polymer. Liquid crystalline polymers (sometimes abbreviated as "LCP") are a class of polymers well known for a variety of uses. Liquid crystalline polymers are often thermoplastic polymers, although they can also be used as thermosets by functionalization or by compounding with a thermoset such as an epoxy. Liquid crystalline polymers are believed to have a fixed molecular shape, e.g., linear, due to the nature of the repeating units in the polymeric chain. The repeating units typically comprise rigid molecular elements. The rigid molecular elements (mesogens) are frequently rod-like or disk-like in shape and are typically aromatic and frequently heterocyclic. The rigid molecular elements can be present in one or both of the main chain (backbone) of the polymer and in the side chains. The rigid molecular elements can be separated by more flexible molecular elements, sometimes referred to as spacers.

Both lyotropic and thermotropic liquid crystalline polymers can be useful. In an aspect, the liquid crystalline polymer can be a thermotropic liquid crystalline polymer. Thermotropic liquid crystalline polymers include liquid crystalline polyesters, liquid crystalline polycarbonates, liquid crystalline poly(ether ether ketones), liquid crystalline poly(ether ketone ketones), and liquid crystalline polyester imides. Thermotropic liquid crystalline polymers can also include polymers comprising a segment of a polymer capable of forming an anisotropic molten phase as part of one polymer chain thereof and a segment of a polymer incapable of forming an anisotropic molten phase as the rest of the polymer chain, and also a composite of a plurality of thermotropic liquid crystalline polymers.

Examples of monomers usable for the formation of the thermotropic liquid crystalline polymers include: (a) an aromatic dicarboxylic acid compound, (b) an aromatic hydroxy carboxylic acid compound, (c) an aromatic diol compound, (d) a sulfur containing compound such as an aromatic dithiol ($d_1$), an aromatic thiophenol ($d_2$), and an aromatic thiol carboxylic acid compound ($d_3$), and (e) an amine compound such as an aromatic hydroxyamine compound and an aromatic diamine compound. The monomers can be used alone or in a combination, for example, (a) and (c); (a) and (d); (a), (b) and (c); (a), (b) and (e); (a), (b), (c) and (e); and the like.

Examples of the aromatic dicarboxylic acid compound (a) include aromatic dicarboxylic acids, such as terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4, 4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and 1,6-naphthalenedicarboxylic acid; and alkyl-, alkoxy- and halogen-substituted derivatives of the above-mentioned aromatic dicarboxylic acids, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the aromatic hydroxy carboxylic acid compound (b) include aromatic hydroxy carboxylic acids, such as 4-hydroxybenzoic acid, 3-hydroxybenzoic acid, 6-hydroxy-2-naphthoic acid, and 6-hydroxy-1-naphthoic acid; and alkyl-, alkoxy- and halogen-substituted derivatives of the aromatic hydroxy carboxylic acids, such as 3-methyl-4-hydroxybenzoic acid, 3,5-dimethyl-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic diol compound (c) include aromatic diols, such as 4,4'-dihydroxydiphenyl, 3,3'-dihydroxydiphenyl, 4,4'-dihydroxytriphenyl, hydroquinone, resorcinol, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl) propane, and bis(4-hydroxyphenyl)methane; and alkyl-, alkoxy- and halogen-substituted derivatives of the aromatic diols, such as chlorohydroquinone, methylhydroquinone, t-butylhydroquinone, phenylhydroquinone, methoxyhydroquinone, phenoxyhydroquinone, 4-chlororesorcinol, and 4-methylresorcinol.

Examples of the aromatic dithiol ($d_1$) include benzene-1,4-dithiol, benzene-1,3-dithiol, 2,6-naphthalene-dithiol, and 2,7-naphthalene-dithiol. Examples of the aromatic thiophenol ($d_2$) include 4-mercaptophenol, 3-mercaptophenol, and 6-mercapto-phenol. Examples of the aromatic thiol carboxylic acid ($d_3$) include 4-mercaptobenzoic acid, 3-mercaptobenzoic acid, 6-mercapto-2-naphthoic acid, and 7-mercapto-2-naphthoic acid.

Examples of the aromatic hydroxyamine compound and the aromatic diamine compound (e) include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, N-acetyl-para-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

Thermotropic liquid crystalline polymers are prepared from monomer(s) as mentioned above by a variety of esterification methods such as melt acidolysis or slurry polymerization, or the like methods. The molecular weight of the thermotropic liquid crystalline polyester that can be used can be 2,000 grams per mole to 200,000 grams per mole (g/mol), or 4,000 g/mol to 100,000 g/mol. The measurement of the molecular weight can be, for example, by determination of the terminal groups of a compressed film thereof according to infrared spectroscopy, or the molecular weight can be the weight average molecular weight determined using gel permeation chromatography based on polystyrene standards.

Thermotropic liquid crystalline polymers can be used either alone or in a mixture of at least two thereof. In an aspect the composition can comprise a thermotropic liquid crystalline polymer such as an aromatic polyester having a melting point of at least 290° C.

In aspect, the liquid crystalline polymer can comprise a liquid crystalline polyester. The liquid crystalline polyester can be derived from an aromatic hydroxycarboxylic acid (such as p-hydroxybenzoic acid and 2-hydroxy-6-naphthoic acid), an aromatic dicarboxylic acid (such as terephthalic acid, isophthalic acid, and 2,6-naphthalenedicarboxylic acid), an aromatic dihydroxy compound (such as hydroquinone, resorcinol, 4,4'-dihydroxydiphenyl, and 2,6-dihydroxynaphthalene), or a combination comprising at least one of the foregoing. Aromatic liquid crystal polyesters can be obtained by polycondensation of 80 mole percent to 100 mole percent (mol %) of p-hydroxybenzoic acid (I), terephthalic acid (II), and 4,4'-dihydroxybiphenyl (III) (including derivatives thereof) (in which the total of (I) and (II) is 60 mol % or more) and 0 mol % to 20 mol % of other aromatic compounds capable of a polycondensation reaction with any of (I), (II), and (III), based on the total moles of (I), (II), (III), and any other aromatic compounds in the polycondensation reaction.

In an aspect, the liquid crystalline polymer is derived from 4-hydroxybenzoic acid and 6-hydroxy-2-naphthoic acid. In an aspect, the liquid crystalline polymer is derived from 4-hydroxybenzoic acid, 6-hydroxy-2-naphthoic acid, naphthalene dicarboxylic acid, and hydroquinone.

Examples of specific commercial liquid crystalline polymers that can be used include, but are not limited to, VECTRA and ZENITE, both commercially available from Celanese, XYDAR, commercially available from Solvay Specialty Polymers, those available from RTP Co., for example, the RTP-3400 series liquid crystalline polymers, and those available from UENO Fine Chemicals Industry, Ltd., for example, LCP-A 5000 and LCP-A 6000.

The liquid crystalline polymer can be present in the composition in an amount of 55 weight percent to 99.5 weight percent (wt %), based on the total weight of the liquid crystalline polymer and the thermoplastic polymer. Within this range, the liquid crystalline polymer can be present in an amount of 60 wt % to 99.5 wt %, or 65 wt % to 99.5 wt %, or 65 wt % to 95 wt %, or 70 wt % to 95 wt %, or 75 wt % to 95 wt %, or 80 wt % to 95 wt %, or 85 wt % to 95 wt %.

In addition to the liquid crystalline polymer, the composition further comprises a thermoplastic polymer comprising a polyetherimide, a polyarylate, or a poly(arylene ether-sulfone).

In an aspect, the thermoplastic polymer comprises a polyetherimide. Polyetherimides comprise more than 1, for example 2 to 1000, or 5 to 500, or 10 to 100 structural units of formula (1)

(1)

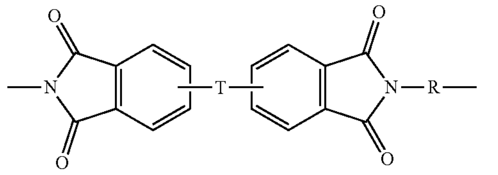

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In an aspect R is divalent group of one or more of the following formulas (2)

(2)

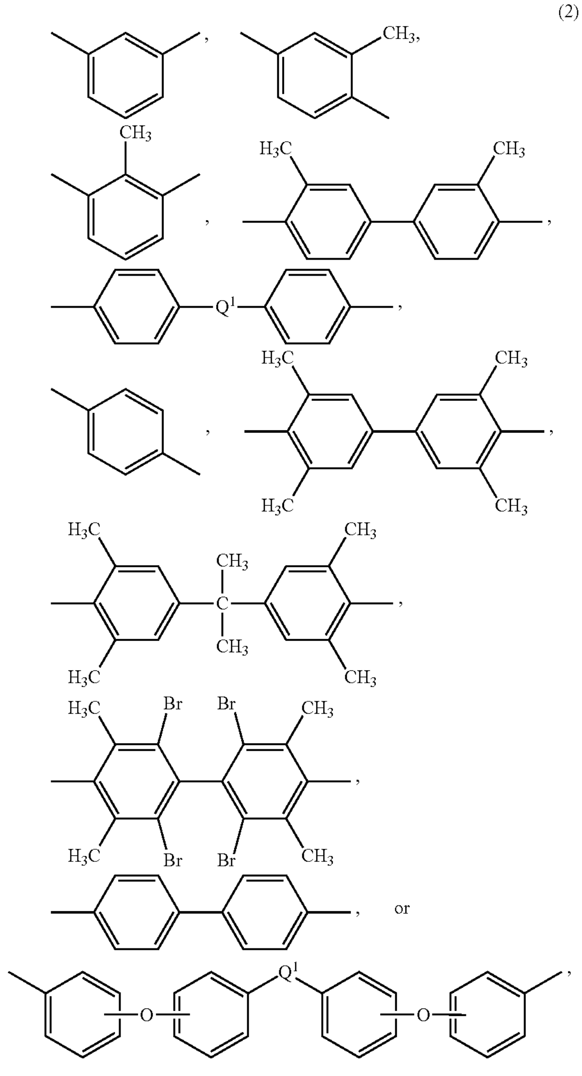

wherein $Q^1$ is —O—, —S—, —C(O)—, —$SO_2$—, —SO—, —$P(R^a)(=O)$— wherein $R^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or —$(C_6H_{10})_z$— wherein z is an integer from 1 to 4. In an aspect R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In an aspect, at least 10 mole percent or at least 50 mole percent of the R groups contain sulfone groups, and in other aspects no R groups contain sulfone groups.

Further in formula (1), T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (3)

(3)

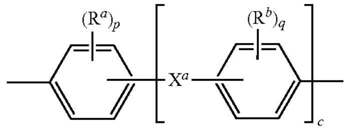

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —$S(O)_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

(3a)

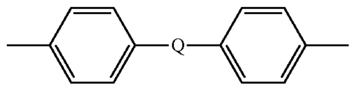

wherein Q is —O—, —S—, —C(O)—, —$SO_2$—, —SO—, —$P(R^a)(=O)$— wherein $R^a$ is a $C_{1-8}$ alkyl or $C_{6-12}$ aryl, or —$C_yH_{2y}$— wherein y is an integer from 1 to 5 or a halogenated derivative thereof (including a perfluoroalkylene group). In an aspect Z is derived from bisphenol A, such that Q in formula (3a) is 2,2-isopropylidene.

In an aspect in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Such materials are available under the trade name ULTEM from SABIC. Alternatively, the polyetherimide can be a copolymer comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety, an example of which is commercially available under the trade name EXTEM from SABIC.

In an aspect, the polyetherimide is a copolymer that optionally comprises additional structural imide units that are not polyetherimide units, for example imide units of formula (4)

(4)

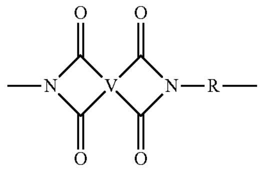

wherein R is as described in formula (1) and each V is the same or different, and is a substituted or unsubstituted $C_{6-20}$ aromatic hydrocarbon group, for example a tetravalent linker of the formulas

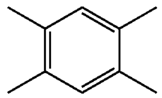

or

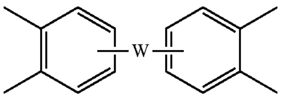

wherein W is a single bond, —O—, —S—, —C(O)—, —$SO_2$—, —SO—, a $C_{1-18}$ hydrocarbylene group, —P($R^a$)(═O)— wherein $R^a$ is a $C_{1-8}$ alkyl or $C_{6-12}$ aryl, or —$C_yH_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 mol % to 10 mol % of the total number of units, or 0 mol % to 5 mol % of the total number of units, or 0 mol % to 2 mol % of the total number of units. In an aspect, no additional imide units are present in the polyetherimide.

The polyetherimide can be prepared by any of the methods known to those skilled in the art, including the reaction of an aromatic bis(ether anhydride) of formula (5) or a chemical equivalent thereof, with an organic diamine of formula (6)

(5)

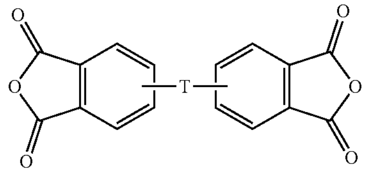

(6)

$$H_2N—R—NH_2$$

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl)benzene, bis(p-methyl-o-aminopentyl)benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In an aspect the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing. In an aspect, the organic diamine is m-phenylenediamine, p-phenylenediamine, or a combination thereof, preferably m-phenylene.

In an aspect, the polyetherimide can comprise a poly(etherimide-siloxane) comprising polyetherimide units of formula (1) and siloxane blocks of formula (7)

(7)

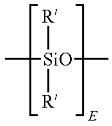

wherein E has an average value of 2 to 100, 2 to 31, 5 to 75, 5 to 60, 5 to 15, or 15 to 40, each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an aspect no bromine or chlorine is present, and in another aspect no halogens are present. Combinations of the foregoing R groups can be used in the same copolymer. In an aspect, the polysiloxane blocks comprise R' groups that have minimal hydrocarbon content. In an aspect, an R' group with a minimal hydrocarbon content is a methyl group.

The poly(etherimide-siloxane)s can be formed by polymerization of an aromatic bis(ether anhydride) of formula (5) and a diamine component comprising an organic diamine (6) as described above or a combination of diamines, and a polysiloxane diamine of formula (8)

(8)

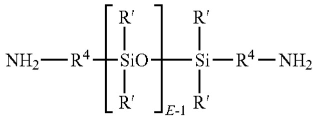

wherein R' and E are as described in formula (7), and $R^4$ is each independently a $C_{2-20}$ hydrocarbon, in particular a $C_{2-20}$ arylene, alkylene, or arylenealkylene group. In an aspect $R^4$ is a $C_{2-20}$ alkylene group, specifically a $C_{2-10}$ alkylene group such as propylene, and E has an average value of 5 to 100, 5 to 75, 5 to 60, 5 to 15, or 15 to 40. Procedures for making the polysiloxane diamines of formula (8) are well known in the art.

In an aspect, the diamine component of the poly(etherimide-siloxane) can contain 10 mol % to 90 mol %, or 20 mol % to 50 mol %, or 25 mol % to 40 mol % of polysiloxane diamine (8) and 10 mol % to 90 mol %, or 50 mol % to 80 mol %, or 60 mol % to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides) (5), to make polyimide blocks that are subsequently reacted together. Thus, the poly(etherimide-siloxane) can be a block, random, or graft copolymer. In an aspect the copolymer is a block copolymer.

Examples of specific poly(etherimide-siloxane)s are described in U.S. Pat. Nos. 4,404,350, 4,808,686 and 4,690,997. In an aspect, the poly(etherimide-siloxane) has units of formula (9)

(9)

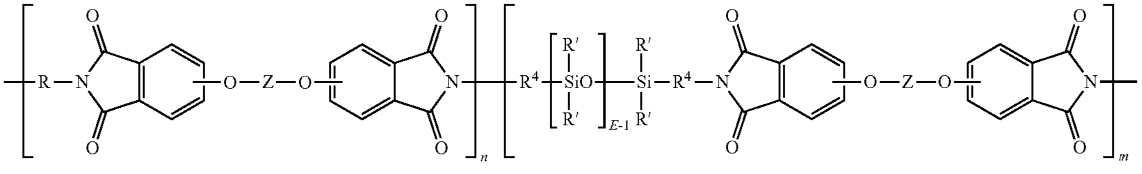

wherein R' and E of the siloxane are as in formula (7), R and Z of the imide are as in formula (1), $R^4$ is as in formula (8), and n and m are each integers greater than 0, and the sum of n and m is 5 to 100. In an aspect of the poly(etherimide-siloxane), R of the etherimide is a phenylene, Z is a residue of bisphenol A, $R^4$ is n-propylene, E is 2 to 50, 5, to 30, or 10 to 40, n+m is 5 to 100, and each R' of the siloxane is methyl.

The relative amount of polysiloxane units and etherimide units in the poly(etherimide-siloxane) depends on the desired properties and are selected using the guidelines provided herein. In particular, as mentioned above, the block or graft poly(etherimide-siloxane) is selected to have a certain average value of E, and is selected and used in amount effective to provide the desired weight percent of polysiloxane units in the composition. In an aspect the poly(etherimide-siloxane) comprises 10 wt % to 50 wt %, 10 wt % to 40 wt %, or 20 wt % to 35 wt % polysiloxane units, based on the total weight of the poly(etherimide-siloxane)

The polyetherimide can have a melt flow rate of 3 grams per 10 minutes (g/10 min) to 30 g/10 min, as measured by American Society for Testing Materials (ASTM) D1238 at 295° C. or 337° C., using a 6.7 kilogram (kg) weight. In an aspect, the polyetherimide has a weight average molecular weight (Mw) of 1,000 g/mol to 150,000 g/mol (or Dalton (Da)), as measured by gel permeation chromatography, using polystyrene standards. In an aspect the polyetherimide has a Mw of 10,000 g/mol to 80,000 g/mol. Such polyetherimides typically have an intrinsic viscosity greater than 0.2 deciliters per gram (dl/g), or, more specifically, 0.35 dl/g to 0.7 dl/g as measured in m-cresol at 25° C.

In an aspect, the thermoplastic polymer comprises a polyarylate. Polyarylate as used herein refers to aromatic polyesters derived from aromatic dicarboxylic acids and bisphenols. Aromatic dicarboxylic acid dichlorides can be used to form the polyarylate.

Aromatic dicarboxylic acids that can be used to prepare polyarylates include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination thereof. Aromatic dicarboxylic acid dichlorides that can be used to prepare polyacrylates include isophthaloyl dichloride, terephthaloyl dichloride, diphenyl dicarboxylic acid dichloride, diphenylether dicarboxylic acid dichloride, diphenylsulfone dicarboxylic acid dichloride, diphenylketone dicarboxylic acid dichloride, diphenylsulfide dicarboxylic acid dichloride, and naphthalene-2,6-dicarboxylic acid dichloride.

Bisphenols include those of the formula (10) or formula (11).

(10)

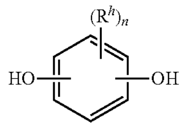

(11)

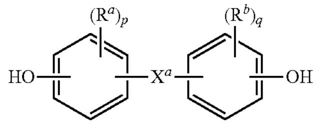

In formula (10), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. In formula (11), $R^a$, $R^b$, p, q, and $X^a$ are as defined for formula (3). Specific dihydroxy compounds include, for example, resorcinol and 2,2-bis(4-hydroxyphenyl) propane ("bisphenol A" or "BPA").

In an aspect, the polyarylate can be a bisphenol A polyarylate, particularly comprising repeating units of formula (12)

(12)

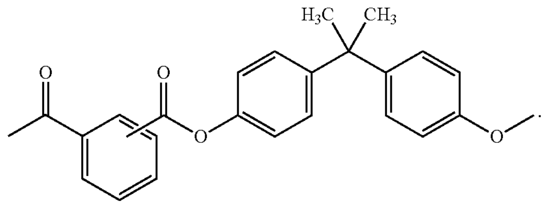

Such polyarylates can be obtained commercially, for example, from Unitika Co. under the tradename of U-Resins, an example of which is U-100 resin.

The polyarylate can have a weight-average molecular weight (Mw) of 7,000 g/mol to 150,000 g/mol, or 8,000 g/mol to 100,000 g/mol, or 9,000 g/mol to 70,000 g/mol. Molecular weights as disclosed herein are determined using gel permeation chromatography using crosslinked styrene divinylbenzene columns calibrated to polystyrene standards, at an elution rate of 0.5 ml/min to 1.5 ml/min and a sample concentration of 1 mg/ml.

The polyarylate can have a glass transition temperature (Tg) of 150° C. to 300° C., or 160° C. to 290° C., or 175° C. to 275° C. Glass transition temperature can be determined, for example, by differential scanning calorimetry (DSC).

In an aspect, the thermoplastic polymer comprises a poly(arylene ether-sulfone). A "poly(arylene ether-sulfone)" as used herein refers to polymers having a backbone of formula (13)

$$—Ar^1—SO_2—Ar^2—O— \quad (13)$$

wherein each $Ar^1$ and $Ar^2$ is the same or different, and is group of formula (3), as described above.

Specific poly(arylene ether-sulfone)s that can be used include polyethersulfone (also known as "PES" or "PESU"), which contains at least 85 wt % of units of formula (13a)

(13a)

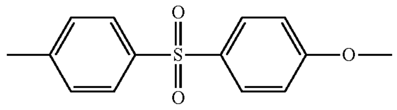

or polyphenylene sulfone (also known as "PPSU" or polyphenylsulfone), which contains at least 85 wt % of units of formula (13b)

(13b)

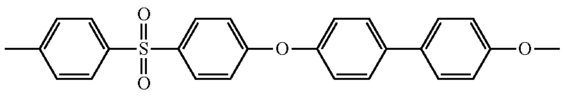

or polyetherethersulfone, which contains at least 85 wt % of units of formula (13c)

(13c)

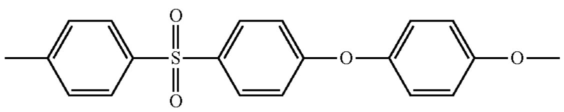

or polysulfone (often referred to as "PSU"), which contains at least 85 wt % of units of formula (13d)

(13d)

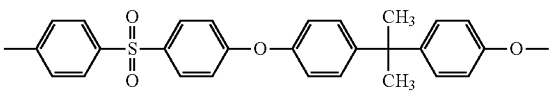

or a combination comprising at least one of the foregoing poly(arylene ether-sulfone)s. Copolymers comprising a combination of at least two types of units of formulas (13a), (13b), (13c), and (13d) can also be used.

The poly(arylene ether-sulfone)s can be linear or branched, having 1 or more, 2 or more, or 5 or more branching points per 1,000 carbon atoms along the polymer chain. In an aspect, the poly(arylene ether-sulfone)s are linear, having 10 or fewer, 5 or fewer, 2 or fewer, or 1 or fewer branching points per 1,000 carbon atoms along the polymer chain. In an aspect, the poly(arylene ether-sulfone)s have a glass transition temperature (Tg) of greater than 175° C., or 200° C. to 280° C., or 255° C. to 275° C. The poly(arylene ether-sulfone)s can further have a weight average molecular weight (Mw) of 500 g/mol to 100,000 g/mol, or 1,000 g/mol to 75,000 g/mol, or 1,500 g/mol to 50,000 g/mol, or 2,000 g/mol to 25,000 g/mol.

Exemplary poly(arylene ether-sulfone)s that can be used include those that are available from sources such as Solvay Specialty Polymers, Quadrant EPP, Centroplast Centro, Duneon, GEHR Plastics, Westlake Plastics, and Gharda Chemicals. Commercial grades of poly(arylene ether-sulfone)s include those with the trade names RADEL, UDEL, ULTRASON, GAFONE, VERADEL, and SUMIKA EXCEL.

In an aspect, the poly(arylene ether-sulfone) is a polyethersulfone, for example according to formula (13a).

Combinations of any of the foregoing thermoplastic polymer can also be used.

The thermoplastic polymer can be present in the composition in an amount of 0.5 wt % to 45 wt %, based on the total weight of the liquid crystalline polymer and the thermoplastic polymer. Within this range, the thermoplastic polymer can be present in an amount of 0.5 wt % to 40 wt %, or 0.5 wt % to 35 wt %, or 1 wt % to 30 wt %, or 5 wt % to 25 wt %, or 5 wt % to 20 wt %, or 5 wt % to 15 wt %, or 3 wt % to 17 wt %, or 4 wt % to 12 wt %, or 20 wt % to 30 wt %.

In addition to the liquid crystalline polymer and the thermoplastic polymer, the composition further comprises a compatibilizer, preferably a polymeric compatibilizer comprising a polyepoxy compound or a poly(ester-carbonate). As used herein, "compatibilizer" refers to an additive used to improve the miscibility of copolymers or to improve the miscibility between polymers or polymer phase and fillers. In an aspect, suitable polymeric compatibilizers can have a weight average molecular weight of, for example, greater than 1,000 grams per mole, or greater than 10,000 grams per mole, determined using gel permeation chromatography in a suitable solvent and relative to suitable standards, each of which can be determined without undue experimentation.

In an aspect, the compatibilizer comprises a polyepoxy compound. When the compatibilizer comprises a polyepoxy compound, the composition comprises a reaction product of the liquid crystalline polymer, the thermoplastic polymer component, and the polyepoxy compound. The polyepoxy compound can be a polymer comprising structural units having pendant epoxy groups. In an aspect, the polyepoxy compound comprises three or more epoxy groups per molecule. In an aspect, the polyepoxy compound comprises an addition polymer of an ethylenically unsaturated epoxy compound (also referred to as an epoxy functional elastomer) or an epoxidized novolak resin.

In an aspect, the polyepoxy compound can be an epoxy functional elastomer. Epoxy functional elastomers include copolymers derived from an alpha olefin and a glycidyl ester of an α,β-unsaturated carboxylic acid. Suitable alpha olefins can include ethylene, propylene, 1-butene, and the like. Ethylene can be preferred. The glycidyl esters of the α,β-unsaturated carboxylic acid can be of the formula (14)

(14)

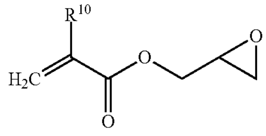

wherein $R^{10}$ can be hydrogen or a $C_{1-6}$ alkyl group, preferably methyl. Examples of glycidyl esters of the α,β-unsaturated carboxylic acid can include glycidyl acrylate, glycidyl methacrylate and glycidyl ethacrylate. The epoxy functional olefinic elastomer is preferably an olefinic copolymer containing 60 wt % to 99.5 wt % of an α-olefin and 0.5 wt % to 40 wt % of a glycidyl ester of an α,β-unsaturated carboxylic acid, preferably 3 wt % to 30 wt %, based on the weight of epoxy functional olefinic elastomer.

For example, the polyepoxy compound can comprise repeating units derived from ethylene and glycidyl methacrylate; ethylene, a $C_{1-6}$ alkyl acrylate, and glycidyl acrylate; ethylene, methyl acrylate, and glycidyl acrylate; ethylene, butyl acrylate, and glycidyl acrylate; or ethylene, vinyl acetate, and glycidyl acrylate. In an aspect, the polyepoxy compound can be an ethylene-glycidyl methacrylate copolymer, an ethylene-glycidyl methacrylate-methyl acrylate terpolymer, or an ethylene-glycidyl methacrylate-vinyl acetate terpolymer. In an aspect, the polyepoxy compound can be an ethylene-glycidyl methacrylate copolymer, preferably comprising 1 mol % to 5 mol % glycidyl methacrylate groups based on the total moles of the polyepoxy compound. Exemplary polyepoxy compounds can include Igetabond, commercially available from Sumitomo, Bondfast E, commercially available from Sumitomo, and Lotader, commercially available from Arkema.

In an aspect, the polyepoxy compound can be a novolak epoxy resin. Novolak epoxy resins can be obtained by reacting novolak-type phenolic resins with epichlorohydrin. Preferred novolak phenolic resins can include those obtained by condensation reaction of phenols and formaldehyde. There is no particular restriction on the starting phenols, but suitable phenols can include phenol, o-cresol, m-cresol, p-cresol, bisphenol A, resorcinol, p-tertiary butyl phenol, bisphenol F, bisphenol S, and mixtures of these.

In an aspect, the compatibilizer comprises a poly(ester-carbonate). Such polycarbonates include recurring carbonate units of formula (15) and repeating ester units of formula (16)

(15)

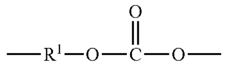

(16)

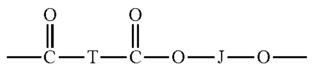

wherein at least 60% of the total number of $R^1$ groups are aromatic, or each $R^1$ contains at least one $C_{6-30}$ aromatic group. Preferably, each $R^1$ can be derived from a dihydroxy compound such as an aromatic dihydroxy compound of formula (10) or a bisphenol of formula (11), as described previously. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis (4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

J in formula (16) is a divalent group derived from an aromatic dihydroxy compound (including a reactive derivative thereof), such as a bisphenol of formula (11), e.g., bisphenol A; and T is a divalent group derived from an aromatic dicarboxylic acid (including a reactive derivative thereof), preferably isophthalic or terephthalic acid wherein the weight ratio of isophthalic acid to terephthalic acid is 91:9 to 2:98. Copolyesters containing a combination of different T or J groups can be used. The polyester units can be branched or linear.

In an aspect, J is derived from a bisphenol of formula (11), e.g., bisphenol A. In another aspect, J is derived from an aromatic dihydroxy compound, e.g., resorcinol. A portion of the groups J, for example up to 20 mol % can be a $C_{2-30}$ alkylene group having a straight chain, branched chain, or cyclic (including polycyclic) structure, for example ethylene, n-propylene, i-proplyene, 1,4-butylene, 1,4-cyclohexylene, or 1,4-methylenecyclohexane. Preferably, all J groups are aromatic.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, or a combination thereof. A specific dicarboxylic acid comprises a combination of isophthalic acid and terephthalic acid wherein the weight ratio of isophthalic acid to terephthalic acid is 91:9 to 2:98. A portion of the groups T, for example up to 20 mol %, can be aliphatic, for example derived from 1,4-cyclohexane dicarboxylic acid. Preferably all T groups are aromatic.

The molar ratio of ester units to carbonate units in the polycarbonates can vary broadly, for example 1:99 to 99:1, or 10:90 to 90:10, or 25:75 to 75:25, or 2:98 to 15:85, depending on the desired properties of the final composition.

Specific poly(ester-carbonate)s are those including bisphenol A carbonate units and isophthalate/terephthalate-bisphenol A ester units, i.e., a poly(bisphenol A carbonate)-co-(bisphenol A-phthalate-ester) of formula (17)

(17)

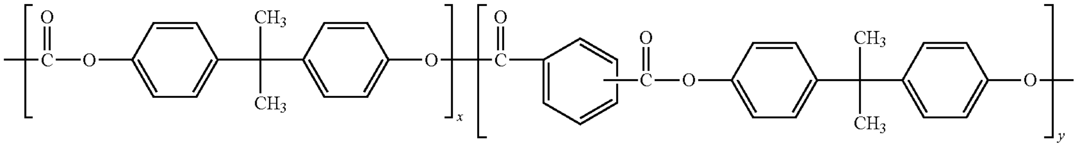

wherein x and y represent the weight percent of bisphenol A carbonate units and isophthalate/terephthalate-bisphenol A ester units, respectively. Generally, the units are present as blocks. In an aspect, the weight ratio of carbonate units x to ester units y in the polycarbonates is 1:99 to 50:50, or 5:95 to 25:75, or 10:90 to 45:55. Copolymers of formula (17) comprising 35 wt % to 45 wt % of carbonate units and 55 wt % to 65 wt % of ester units, wherein the ester units have a molar ratio of isophthalate to terephthalate of 45:55 to 55:45 are often referred to as poly(carbonate-ester)s (PCE).

Copolymers comprising 15 wt % to 25 wt % of carbonate units and 75 wt % to 85 wt % of ester units wherein the ester units have a molar ratio of isophthalate to terephthalate from 98:2 to 88:12 are often referred to as poly(phthalate-carbonate)s (PPC).

In another aspect, the poly(ester-carbonate) is a poly (carbonate-co-monoarylate ester) of formula (18) that includes aromatic carbonate units (15) and repeating monoarylate ester units (18)

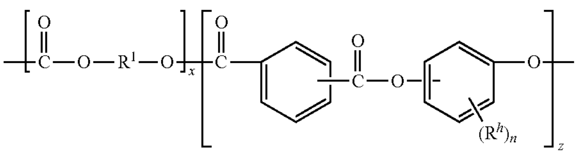

wherein $R^1$ is as defined in formula (15), and each $R^h$ is as defined in formula (10). Preferably, each $R^h$ is independently a C1-4 alkyl, and n is 0 to 3, 0 to 1, or 0. The mole ratio of carbonate units x to ester units z can be from 99:1 to 1:99, or from 98:2 to 2:98, or from 90:10 to 10:90. In an aspect the mole ratio of x:z is from 50:50 to 99:1, or from 1:99 to 50:50.

In an aspect, the poly(ester-carbonate) comprises aromatic ester units and monoarylate ester units derived from the reaction of a combination of isophthalic and terephthalic diacids (or a reactive derivative thereof) with resorcinol (or a reactive derivative thereof) to provide isophthalate/terephthalate-resorcinol ("ITR" ester units). The ITR ester units can be present in the poly(ester-carbonate) in an amount greater than or equal to 95 mol %, preferably greater than or equal to 99 mol %, and still more preferably greater than or equal to 99.5 mol %, based on the total moles of ester units in the polycarbonate. A preferred poly(ester-carbonate) comprises bisphenol A carbonate units, and ITR ester units derived from terephthalic acid, isophthalic acid, and resorcinol, i.e., a poly(bisphenol A carbonate-co-isophthalate/terephthalate-resorcinol ester) of formula (19)

(19)

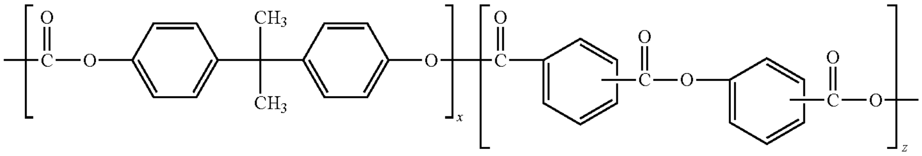

wherein the mole ratio of x:z is from 98:2 to 2:98, or from 90:10 to 10:90. In an aspect the mole ratio of x:z is from 50:50 to 99:1, or from 1:99 to 50:50. The ITR ester units can be present in the poly(bisphenol A carbonate-co-isophthalate-terephthalate-resorcinol ester) in an amount greater than or equal to 95 mol %, preferably greater than or equal to 99 mol %, and still more preferably greater than or equal to 99.5 mol %, based on the total moles of ester units in the copolymer. Other carbonate units, other ester units, or a combination thereof can be present, in a total amount of 1 mol % to 20 mol %, based on the total moles of units in the copolymers, for example monoaryl carbonate units of formula (20) and bisphenol ester units of formula (21):

(20)

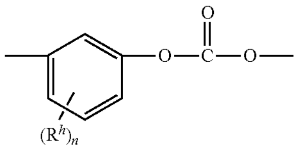

(21)

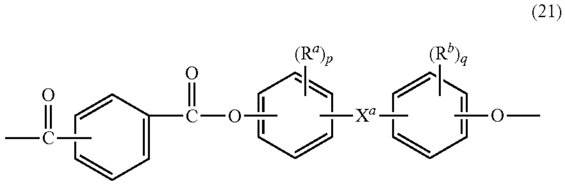

wherein, in the foregoing formulae, $R^h$ is each independently a $C_{1-10}$ hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —$S(O)_2$—, —C(O)—, or a $C_{1-13}$ alkylidene of formula —$C(R^c)(R^d)$— wherein $R^c$ and $R^d$ are each independently hydrogen or $C_{1-12}$ alkyl, or a group of the formula —$C(=R^e)$— wherein $R^e$ is a divalent $C_{1-12}$ hydrocarbon group. The bisphenol ester units can be bisphenol A phthalate ester units of the formula (22)

(22)

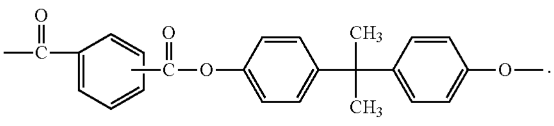

In an aspect, the poly(bisphenol A carbonate-co-isophthalate/terephthalate-resorcinol ester) comprises 1 mol % 90 mol % of bisphenol A carbonate units, 10 mol % to 99 mol % of isophthalic acid-terephthalic acid-resorcinol ester units, and optionally 1 mol % to 60 mol % of resorcinol carbonate units, isophthalic acid-terephthalic acid-bisphenol A phthalate ester units, or a combination thereof. In another aspect, a poly(bisphenol A carbonate-co-isophthalate/terephthalate resorcinol ester) comprises 10 mol % to 20 mol % of bisphenol A carbonate units, 20 mol % to 98 mol % of isophthalic acid-terephthalic acid-resorcinol ester units, and optionally 1 mol % to 60 mol % of resorcinol carbonate units, isophthalic acid-terephthalic acid-bisphenol A phthalate ester units, or a combination thereof.

The poly(ester-carbonate)s can have a weight average molecular weight (Mw) of 2,000 g/mol to 100,000 g/mol, preferably 3,000 g/mol to 75,000 g/mol, more preferably 4,000 g/mol to 50,000 g/mol, more preferably 5,000 g/mol to 35,000 g/mol, and still more preferably 17,000 g/mol to 30,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

The compatibilizer can be present in an amount of 1 part by weight to 60 parts by weight (pbw) based on the total weight of the thermoplastic polymer component. Within this range, the compatibilizer can be present in an amount of 5 pbw to 50 pbw, or 5 pbw to 45 pbw, or 5 pbw to 40 pbw, or 7 pbw to 38 pbw, or 10 pbw to 35 pbw, or 1 pbw to 40 pbw, or 1 pbw to 35 pbw, or 1 pbw to 30 pbw, each based on the total weight of the thermoplastic polymer component (i.e., the polyetherimide, the polyarylate, or the poly(arylene ether-sulfone)).

In an aspect, the composition comprises, consists essentially of, or consists of the liquid crystalline polymer, the thermoplastic polymer comprising a polyetherimide, a polyarylate, or a poly(arylene ether-sulfone), and the compatibilizer. The composition can optionally exclude any component other than the liquid crystalline polymer, the polyetherimide, the polyarylate, the poly(arylene ether-sulfone) and the compatibilizer that is not specifically described herein. In an aspect, the composition comprises less than 5 wt %, or less than 1 wt % (based on the total weight of the composition) of any thermoplastic polymer other than the polyetherimide, the poly(arylene ether-sulfone), polyarylate, and the poly(ester-carbonate). In an aspect, the composition comprises less than 0.5 wt %, or less than 0.1 wt % (based on the total weight of the composition) of any compatibilizer other than the polyepoxy compound or the poly(ester-carbonate). In an aspect, the composition excludes any compatibilizer other than the polyepoxy compound or the poly(ester-carbonate). In an aspect, the composition can minimize (i.e., comprise less than 0.5 wt % or less than 0.1 wt %, based on the total weight of the composition) or exclude a compatibilizer which is not a polymeric compatibilizer. In an aspect, the composition can minimize (i.e., comprise less than 0.5 wt % or less than 0.1 wt %, based on the total weight of the composition) or exclude a compatibilizer having a molecular weight of less than 1,000 grams per mole, or less than 500 grams per mole.

In an aspect, the composition can optionally further comprise an additive composition, comprising one or more additives selected to achieve a desired property, with the proviso that the additive(s) are also selected so as to not significantly adversely affect a desired property of the composition. The additive composition or individual additives can be mixed at a suitable time during the mixing of the components for forming the composition. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination thereof. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 wt % to 10.0 wt %, or 0.01 wt % to 5 wt %, each based on the total weight of the composition.

In a specific aspect, the composition comprises the reaction product of 85 wt % to 95 wt % of the liquid crystalline polymer; 5 wt % to 15 wt % of the polyetherimide; and 5 pbw to 40 pbw of the polyepoxy compound based on the total weight of the polyetherimide. The liquid crystalline polymer comprises aromatic ester repeating units derived from 4-hydroxybenzoic acid and 6-hydroxy-2-naphthoic acid. The polyetherimide can be a polyetherimide homopolymer comprising repeating units derived from bisphenol A and m-phenylene diamine or a poly(etherimide-siloxane) copolymer comprising etherimide repeating units derived from bisphenol A and m-phenylene diamine and siloxane repeating units derived from dimethylsiloxane. The polyepoxy compound can comprise an ethylene-glycidyl methacrylate copolymer preferably comprising 1 mol % to 5 mol % glycidyl methacrylate groups based on the total moles of the polyepoxy compound.

In a specific aspect, the composition comprises the reaction product of 85 wt % to 95 wt % of the liquid crystalline polymer; 5 wt % to 15 wt % of the polyarylate; and 5 pbw to 40 pbw of the polyepoxy compound based on the total weight of the polyarylate. The liquid crystalline polymer can comprise aromatic ester repeating units derived from 4-hydroxybenzoic acid and 6-hydroxy-2-naphthoic acid. The polyarylate can be a bisphenol A polyarylate. The polyepoxy compound can comprise an ethylene-glycidyl methacrylate copolymer preferably comprising 1 mol % to 5 mol % glycidyl methacrylate groups based on the total moles of the polyepoxy compound.

In another specific aspect, the composition comprises the reaction product of 85 wt % to 95 wt % of the liquid crystalline polymer; 5 wt % to 15 wt % of the poly(arylene ether-sulfone); and 5 pbw to 40 pbw of the polyepoxy compound based on the total weight of the poly(arylene ether-sulfone). The liquid crystalline polymer can comprise aromatic ester repeating units derived from 4-hydroxybenzoic acid and 6-hydroxy-2-naphthoic acid. The poly(arylene ether-sulfone) can be a polyethersulfone. The polyepoxy compound can comprise an ethylene-glycidyl methacrylate copolymer preferably comprising 1 mol % to 5 mol % glycidyl methacrylate groups based on the total moles of the polyepoxy compound.

In an aspect, the composition can be provided in the form of a masterbatch, which can be combined (e.g., melt-mixed, dry-blended, or the like) with an additional polymer to provide the final composition. For example, the masterbatch can be combined with a second amount of the liquid crystalline polymer to provide the composition described above.

In an aspect, the masterbatch can comprise 55 wt % to 70 wt % of the liquid crystalline polymer; 30 wt % to 45 wt % of the thermoplastic polymer; wherein weight percent is based on the total amount of the liquid crystalline polymer and the thermoplastic polymer; and 10 parts by weight to 60 parts by weight of the compatibilizer, based on the total weight of the thermoplastic polymer. In an aspect, the masterbatch comprises 55 wt % to 65 wt %, or 57 wt % to 63 wt % of the liquid crystalline polymer. In an aspect, the masterbatch comprises 30 wt % to 40 wt %, or 32 wt % to 38 wt % of the thermoplastic polymer. In an aspect, the masterbatch comprises 10 parts by weight to 20 parts by weight, or 12 parts by weight to 16 parts by weight of the compatibilizer. Other than the component amounts specified in this paragraph, all of the compositional variations of the composition of the present disclosure described above apply to the liquid crystalline polymer masterbatch of this paragraph. In an aspect, the masterbatch consists of the liquid crystalline polymer, the thermoplastic polymer, and the compatibilizer. In an aspect, the masterbatch can optionally further comprise one or more additives, for example in an amount of 0.1 wt % to 10 wt %, based on the total weight of the masterbatch.

In an aspect, the above-described masterbatch can be blended with an amount of the liquid crystalline polymer effective to provide a composition comprising 70 wt % to 99.5 wt % of the liquid crystalline polymer, 0.5 wt % to 30 wt % of the thermoplastic polymer, wherein weight percent is based on the total weight of the liquid crystalline polymer and the thermoplastic polymer, and 1 part by weight to 60 parts by weight of the compatibilizer, based on the total weight of the thermoplastic polymer.

In a specific aspect of the masterbatch, the liquid crystalline polymer comprises aromatic ester repeating units derived from 4-hydroxybenzoic acid and 6-hydroxy-2-naphthoic acid; the thermoplastic polymer is a polyetherimide comprising repeating units derived from bisphenol A dianhydride and m-phenylene diamine or a poly(etherimide-siloxane) copolymer comprising etherimide repeating units derived from bisphenol A dianhydride and m-phenylene diamine and siloxane repeating units derived from dimethylsiloxane; and the compatibilizer is an ethylene-glycidyl methacrylate copolymer preferably comprising 1 mole percent to 5 mole percent glycidyl methacrylate groups based on the total moles of the polyepoxy compound.

In another specific aspect of the masterbatch, the liquid crystalline polymer comprises aromatic ester repeating units derived from 4-hydroxybenzoic acid and 6-hydroxy-2-naphthoic acid; the thermoplastic polymer is a bisphenol A polyarylate; and the compatibilizer is an ethylene-glycidyl methacrylate copolymer preferably comprising 1 mole percent to 5 mole percent glycidyl methacrylate groups based on the total moles of the polyepoxy compound.

In another specific aspect of the masterbatch, the liquid crystalline polymer comprises aromatic ester repeating units derived from 4-hydroxybenzoic acid and 6-hydroxy-2-naphthoic acid; the thermoplastic polymer is a polyethersulfone; and the compatibilizer is an ethylene-glycidyl methacrylate copolymer preferably comprising 1 mole percent to 5 mole percent glycidyl methacrylate groups based on the total moles of the polyepoxy compound.

The composition can be manufactured by various methods generally known in the art. For example, the liquid crystalline polymer, the thermoplastic polymer component, and the compatibilizer can be blended, for example in a high-speed mixer or by handmixing. The blend can be fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long (i.e., 0.635 centimeters) or less as desired. Such pellets can be used for subsequent molding, shaping, or forming, for example, compression molding, injection molding, or the like.

In an aspect, a masterbatch can be prepared by blending the liquid crystalline polymer, the thermoplastic polymer, and the compatibilizer, for example in amounts as described above. Blending of the masterbatch can be achieved, for example, by melt-mixing (e.g., in a high-speed mixer or by handmixing), compounding in an extruder, dry-blending, or the like. A second amount of liquid crystalline polymer can be blended with the masterbatch, for example by dry-blending or melt-mixing to provide the final composition.

Molded samples of the composition can exhibit one or more advantageous properties. For example, a molded sample of the composition can have a heat deflection temperature of at least 200° C., for example, at least 205° C., or 210° C. to 230° C., as determined according to ASTM D648 at a load of 0.45 MPa. A molded sample of the composition can exhibit a melting temperature from 260° C. to 350° C., for example 270° C. to 330° C., or 275° C. to 300° C., determined by differential scanning calorimetry according to ISO 11357. A molded sample of the composition can exhibit a dissipation factor of 0.0005 to 0.005, or 0.0005 to 0.003, or 0.001 to 0.003 from 1 GHz to 25 GHz, in particular at 5 GHz or at 20 GHz. In an aspect, the composition can exhibit at least one of the foregoing properties, or at least two of the foregoing properties, or each of the foregoing properties.

The composition can also exhibit a desirable processing window. The processing window can be taken as the difference between the melting temperature (Tm) and the crystallization temperature (Tc). In an aspect, the Tm−Tc can be increased by 0.1° C. to 3° C., or 0.2° C. to 2.5° C., or 0.3° C. to 2.3° C. relative to a comparative composition (e.g., the liquid crystalline polymer without the thermoplastic polymer and compatibilizer, or the liquid crystalline polymer and the thermoplastic polymer without the compatibilizer). In an aspect, the Tm−Tc can be increased by 0.3° C. to 2.1° C., or 0.5° C. to 2.0° C., for example when the thermoplastic polymer is polyetherimide, relative to a comparative composition including the same liquid crystalline polymer and polyetherimide and excluding the compatibilizer. In an aspect, the Tm−Tc can be increased by 0.2° C. to 2.3° C., for example when the thermoplastic polymer is polyetherimide-siloxane, relative to a comparative composition including the same liquid crystalline polymer and polyetherimide siloxane and excluding the compatibilizer. In an aspect, the Tm−Tc can be increased by 0.3° C. to 2° C., or 0.5° C. to 1.5° C., or 1.1° C. to 1.5° C., for example when the thermoplastic polymer is a polyarylate, relative to a comparative composition including the same liquid crystalline polymer and polyarylate and excluding the compatibilizer.

Articles comprising the composition represent another aspect of the present disclosure. Articles can be prepared, for example, by molding, extruding, or shaping the above-described composition into an article. The composition can be molded into useful shaped articles by a variety of methods, such as injection molding, extrusion, rotational molding, blow molding and thermoforming. Exemplary articles can be in the form of a fiber, a film, a sheet, a pipe, or a molded part. The physical properties of the composition described herein can provide articles that are particularly well-suited for use in electronic applications, or where a combination of good thermal and dielectric properties can be advantageous. For example, the composition can be particularly well-suited for use in a consumer electronic device, a lighting component, a display component, or a wire or cable component.

This disclosure is further illustrated by the following examples, which are non-limiting.

EXAMPLES

Materials for the following examples are described in Table 1.

TABLE 1

| Component | Description | Supplier |
|---|---|---|
| LCP-1 | Wholly aromatic liquid crystal polyether resin comprising repeating units derived from 4-hydroxybenzoic acid and hydroxynaphthoic acid, obtained as UENO LCP-A 5000 | UENO Fine Chemicals Industry, Ltd. |
| LCP-2 | Wholly aromatic liquid crystal polyether resin comprising repeating units derived from4-hydroxybenzoic acid, hydroxynaphthoic acid, naphthalenedicarboxylic acid, and hydroquinone, obtained as UENO LCP-A 6000 | UENO Fine Chemicals Industry, Ltd. |
| PEI | Polyetherimide comprising repeating units derived from 2,2-bis[4-(3,4-dicarboxyphenoxy)phenyl] propane dianhydride with meta-phenylene diamine, having a weight average molecular weight of 45,000 grams per mole, as determined by gel permeation chromatography relative to polystyrene standards | SABIC |
| PEI-Si | Poly(etherimide-siloxane) block copolymer having repeating units derived from bisphenol A dianhydride, m-phenylene diamine and an aminopropyl terminated polydimethylsiloxane containing on average 10 silicon atoms, having 20 weight percent siloxane based on the total weight of the copolymer and a melt flow rate of 7 g/10 min at 295° C. and 6.7 kgf | SABIC |
| Polyepoxy | Ethylene-glycidyl methacrylate copolymer containing 2.6 mole percent of glycidyl methacrylate (approximately 20 glycidyl methacrylate groups per chain), having a weight average molecular weight of 123,000 grams per mole, a dispersity index of 5.6, a melt flow rate of 3.0 grams per 10 minutes at 190° C. according to JIS K7210*1, obtained as Igetabond E | Sumitomo Chemical Co. |
| PEC | Poly(ester carbonate) comprising ITR (isophthalic acid-terephthalic acid-resorcinol) and bisphenol A made using interfacial polymerization, with an ester content 83 mol %, Mw of 21,000 g/mol and a polydispersity index of 2.5 as determined by gel permeation chromatography using bisphenol A polycarbonate standards | SABIC |

TABLE 1-continued

| Component | Description | Supplier |
|---|---|---|
| PAR | Bisphenol A polyarylate obtained as U-100 | Unitika |
| PES | Polyethersulfone having repeating units derived from dichlorodiphenyl sulfone and dihydroxy diphenyl sulfone, having a Tg of 227° C., obtained as ULTRASON E2010 | BASF |

Compositions of the following Examples were prepared by compounding the components of the composition on a 26 mm Coperion W&P twin screw extruder. All materials were blended together and fed through the main feeder. The compounding profile is shown in Table 2.

TABLE 2

| Parameters | Unit | Set Values |
|---|---|---|
| Zone 1 Temp | ° C. | 150 |
| Zone 2 Temp | ° C. | 260 |
| Zone 3 Temp | ° C. | 320 |
| Zone 4 Temp | ° C. | 320 |
| Zone 5 Temp | ° C. | 320 |
| Zone 6 Temp | ° C. | 320 |
| Zone 7 Temp | ° C. | 320 |
| Zone 8 Temp | ° C. | 320 |
| Zone 9 Temp | ° C. | 320 |
| Zone 10 Temp | ° C. | 320 |
| Zone 11 Temp | ° C. | 320 |
| Die Temp | ° C. | 310 |
| Screw speed | rpm | 300 |
| Throughput | kg/hr | 30 |

The resulting strand of composite was cut into pellets and dried for further molding and evaluation. Extruded pellets were then molded into testing bars using a Fanuc S-2000i injection molding machine with an Axxicon tool according to the injection molding profile shown in Table 3.

TABLE 3

| Parameters | Unit | Set Values |
|---|---|---|
| Cnd: Pre-drying time | Hour | 4 |
| Cnd: Pre-drying temp | ° C. | 150 |
| Hopper temp | ° C. | 70 |
| Zone 1 temp | ° C. | 290 |
| Zone 2 temp | ° C. | 305 |
| Zone 3 temp | ° C. | 305 |
| Nozzle temp | ° C. | 300 |
| Mold temp | ° C. | 120 |
| Screw speed | rpm | 100 |
| Back pressure | $kgf/cm^2$ | 70 |
| Decompression | mm | 3 |
| Injection time | s | 0.54 |
| Holding time | s | 6 |
| Cooling time | s | 20 |
| Shot volume | mm | 32 |
| Switch point(mm) | mm | 10 |
| Injection speed(mm/s) | mm/s | 50 |
| Holding pressure | $kgf/cm^2$ | 300 |
| Cushion | mm | 9 |

Physical testing of the compositions was carried out according to the following test standards.

Melting temperature (Tm) was determined using differential scanning calorimetry (DSC) and taken as the peak melt temperature, according to ISO 11357. Samples were heated and cooled at a rate of 15° C. per minute per ISO 10350 using a TA Q2000 Instrument.

Heat Deflection Temperature (HDT) was determined according to ASTM D648 using a testing stress of 0.45 MPa or 1.8 MPa and a specimen thickness of 3.2 millimeters.

Melt viscosity (MV) was determined by capillary rheometry according to ASTM D3835, or by parallel plate rheometry at a temperature of 285° C. (for examples 1-11 and comparative examples 1-5) or 325° C. (for example 12 and comparative example 6) and at a shear rate of 100 $s^{-1}$.

Tensile properties were determined according to ASTM D638 using a test speed of 50 mm/min.

Moisture absorption was determined from a specimen bar having a thickness of 3.2 mm based on ISO 62 for 24 hours at 23° C. at 50% relative humidity (RH).

Dissipation factor (Df) was measured using a split post dielectric resonator (SPDR) fixture. A sample size of 127 mm×12.7 mm×0.4 mm was used for a testing frequency of 20 GHz. A sample size of 100 mm×70 mm×1 mm was used for a testing frequency of 5 GHz.

Melt strength was determined using a setup similar to high-temperature extensional rheology of linear, branched, and hyper-branched polycarbonates, as described in Sur, S., Chellamuthu, M., and Rothstein, J.; High-temperature extensional rheology of linear, branched, and hyper-branched polycarbonates; Rheol Acta, 58, 557-572 (2019) (DOI 10.1007/s00397-019-01157-9), incorporated herein by reference, via capillary breakup extensional rheometer (CaBER). In this test, a parallel plate fixture is used on a rotational rheometer to allow the measurement of the peak force, which reflects the melt strength of the material, at a certain temperature under a specified pulling speed. Particularly, small plates cut from injection molded thin specimens are placed between the parallel plates and are then heated up to the testing temperature (e.g., 15° C. to 20° C. higher than the melting temperature of the polymer). A linear increase in the gap between the plates occurs with a constant pulling speed. The peak force measured until failure of the melt can be attributed to the melt tension of polymer. Melt strength for examples 1-11 and comparative examples 1-5 was determined at 300° C. Melt strength for example 12 and comparative example 6 was determined at 325° C. and 340° C.

Exemplary compositions and their physical properties are described in Table 4. The amount of each component in the composition is provided in weight percent, based on the total weight of the composition.

TABLE 4

| Component | Unit | CE1 | CE2 | E1 | E2 | E3 | CE3 | E4 | E5 | E6 |
|---|---|---|---|---|---|---|---|---|---|---|
| LCP-1 | % | 100 | 90 | 88 | 89 | 86.5 | 90 | 89 | 94.5 | 83.5 |
| LCP-2 | % | | | | | | | | | |
| PEI | % | | 10 | 9.5 | 10 | 10 | | | | |
| PEI-Si | % | | | | | | 10 | 10 | 5 | 15 |

TABLE 4-continued

| | | | | | | | | | | |
|---|---|---|---|---|---|---|---|---|---|---|
| Polyepoxy | % | | | 2.5 | 1 | 3.5 | | 1 | 0.5 | 1.5 |
| PEC | % | | | | | | | | | |
| PAR | | | | | | | | | | |
| PES | | | | | | | | | | |
| Properties | | | | | | | | | | |
| Tm | ° C. | 279 | 280 | 282 | 280 | 280 | 280 | 280 | 280 | 281 |
| HDT (0.45) | ° C. | 221 | 222 | 217 | 218 | 217 | 223 | 221 | 225 | 217 |
| HDT (1.8) | ° C. | 168 | 181 | 172 | 175 | 168 | 174 | 174 | 178 | 163 |
| Melt strength at 300° C. | N | 1.8 | 1.2 | 2.9 | 1.9 | 5.9 | 1.2 | 2.66 | 1.7 | 3.4 |
| Melt strength at 325° C. | N | | | | | | | | | |
| Melt strength at 340° C. | N | | | | | | | | | |
| Tm-Tc | ° C. | 41.6 | 41 | 43 | 42.2 | 41.9 | 41.3 | 42.1 | 40.8 | 42 |
| MV at 285° C. | Pa-s | 416 | 548 | 672 | 386 | 852 | 250 | 512 | 203 | 718 |
| MV at 325° C. | Pa-s | | | | | | | | | |
| Tensile Modulus | MPa | 7800 | 9700 | 8600 | 8900 | 7000 | 10100 | 9500 | 10300 | 6600 |
| Tensile Strength at yield | MPa | 107 | 181 | 162 | 183 | 159 | 189 | 176 | 178 | 159 |
| Df at 5 GHz | | 0.0023 | 0.0019 | 0.0020 | 0.0019 | 0.0023 | 0.0028 | 0.0026 | 0.0026 | 0.0024 |
| Df at 20 GHz | | 0.0022 | 0.0021 | 0.0024 | 0.0022 | 0.0024 | 0.0024 | 0.0025 | 0.0023 | 0.0027 |
| Moisture Absorption | % | <0.001 | <0.001 | <0.001 | <0.001 | 0.003 | <0.001 | <0.001 | <0.001 | <0.001 |

| Component | Unit | E7 | E8 | E9 | CE4 | E10 | CE5 | E11 | CE6 | E12 |
|---|---|---|---|---|---|---|---|---|---|---|
| LCP-1 | % | 72.5 | 70 | 88 | 90 | 89 | 96 | 89 | | |
| LCP-2 | % | | | | | | | | 100 | 89 |
| PEI | % | | | | | | | | | 10 |
| PEI-Si | % | 25 | 25 | 9.5 | | | | | | |
| Polyepoxy | % | 2.5 | 5 | | | 1 | | 1 | | 1 |
| PEC | % | | | 2.5 | | | | | | |
| PAR | | | | | 10 | 10 | 4 | | | |
| PES | | | | | | | | 10 | | |
| Properties | | | | | | | | | | |
| Tm | ° C. | 281 | 282 | 280 | 280 | 280.9 | 279.3 | 280.3 | 323 | 322.6 |
| HDT (0.45) | ° C. | 213 | 209 | 220 | 220 | 213 | 220 | 220 | 281 | 278 |
| HDT (1.8) | ° C. | 162 | 161 | 167 | 177 | 163 | 167 | 173 | 258 | 215 |
| Melt strength at 300° C. | N | 7.2 | 15.1 | 2.5 | 3.82 | 6.27 | 2.58 | 2.61 | | |
| Melt strength at 325° C. | N | | | | | | | | 0.31 | 0.49 |
| Melt strength at 340° C. | N | | | | | | | | 0.27 | 0.35 |
| Tm-Tc | ° C. | 42.7 | 43.5 | 41.5 | 35.2 | 36.6 | 35.5 | 41.7 | 23.4 | 25.3 |
| MV at 285° C. | Pa-s | 802 | 929 | 480 | 500 | 684 | 503 | 617 | | |
| MV at 325° C. | Pa-s | | | | | | | | 278 | 267 |
| Tensile Modulus | MPa | 6100 | 5700 | 9900 | 7400 | 6700 | 8400 | 7500 | 9000 | 6800 |
| Tensile Strength at yield | MPa | 147 | 143 | 168 | 138 | 137 | 131 | 153 | 79 | 120 |
| Df at 5 GHz | | 0.0024 | 0.0031 | 0.0026 | 0.0024 | 0.0024 | 0.0022 | 0.0026 | 0.0017 | 0.0019 |
| Df at 20 GHz | | 0.0030 | 0.0034 | 0.0025 | 0.0025 | 0.0026 | 0.0025 | 0.0030 | 0.0018 | 0.0020 |
| Moisture Absorption | % | 0.007 | 0.007 | <0.001 | <0.001 | <0.001 | <0.001 | 0.003 | <0.001 | 0.003 |

To improve the processability (e.g., the processing window, defined as the difference between Tm and Tc, shown as "Tm−Tc" in Table 4) of liquid crystalline polymer compositions without adversely affecting the low moisture uptake and dielectric performance, polyetherimide was added to the composition due to its stability, low dissipation factor over a broad frequency range, and low moisture uptake.

As shown in Table 4, incorporation of either a PEI or PEI-Si together with a polyepoxy compound in a liquid crystalline polymeric composition can improve melt strength compared to a pristine LCP, as shown in comparative example 1 (CE1). Without wishing to be bound by theory, it is believed that the presence of the polyepoxy compound can increase the melt strength through its reaction with PEI (or PEI-Si), the LCP, or both (e.g., during compounding), providing a branched structure, disrupting the orientation of the crystalline structure within the LCP. As shown in Table 4, the melt strength at 300° C. for E1-E9 compositions (compositions including LCP-1 and PEI or PEI-Si) was 1.7 N or greater (e.g., 1.7 to 15.1 N). Comparing E1 and CE2, adding the polyepoxy can provide a 1.7 N increase in melt strength. Comparing E2 and CE2, adding the polyepoxy can provide a 0.7 N increase in melt strength. Further increasing the polyepoxy content as in E3 led to a 4.7 N increase related to CE2. E12 shows that an improvement can also be seen when a different LCP is used with PEI and polyepoxy. The addition of the PEI alone did not provide an improvement in melt strength. Looking at CE1 and CE2, addition of 10 wt % PEI actually decreased the melt strength of the composition by 0.6 N. A similar effect can be seen for PEI-Si. Looking at CE1 and CE3, it can be seen that the addition of 10 wt % PEI-Si similarly resulted in a decreased melt strength of 1.2 N (compared to 1.8 N for CE1). Rather it is the particular combination of the LCP, thermoplastic component, and the compatibilizer that enables the desired improvement in melt strength.

For compositions including PEI-Si, including only 0.5 wt % of the polyepoxy increased the melt strength by 0.5 N (i.e., 1.7 N of E5 compared to 1.2 N of CE3). Further increasing the polyepoxy content (e.g., up to 5 wt %) provided a melt strength of 15.1 N, a 13.9 N increase relative to CE3. Replacing the polyepoxy with PEC as in E9 provided a similar melt strength of 2.5 N (compared to 1.2 N when PEI-Si and LCP-1 were used alone as in CE3). Comparing CE4 and E10, including the polyepoxy component in an LCP/PAR composition can provide a 64% improvement in melt strength at 300° C. (i.e., increasing from 3.82 N of CE4 to 6.27 N of E10).

Examples 1 and 2 (E1 and E2) in Table 4 both exhibit good retention of the advantages of the pristine LCP (e.g., low dissipation factor). The composition of example 9 demonstrates that similar affects can be achieved with the use of PEC as a compatibilizer. Comparative examples 4 and 5, and examples 10 and 11 illustrate that a thermoplastic polymer such as a polyarylate or a polyethersulfone can also provide the desired improvement in properties of the resulting LCP composition. Example 12 shows that similar effects can be achieved when a different LCP polymer is used.

Also as shown in Table 4, incorporation of either a PEI or PEI-Si together with a polyepoxy compound in a liquid crystalline polymeric composition can improve the processability of the composition. Processability of the compositions can be assessed in terms of the difference between the melting temperature (Tm) and the crystallization temperature (Tc). As shown in Table 4, the Tm−Tc for E1-E3 (compositions including LCP-1, PEI and polyeopxy) was increased by 0.9° C. to 2° C. relative to CE2 (i.e., LCP-1 and PEI with no compatibilizer). When LCP-1 was used with PEI-Si (E4 and E6-9), the Tm−Tc was increased by 0.2° C. to 2.2° C. relative to CE3 (i.e., LCP-1 and PEI-Si with no compatibilizer). E10 shows that when LCP-1, PAR, and polyepoxy were combined, the Tm−Tc increased by 1.4° C. (relative to CE4). When LCP-2 was used with PEI (E12), the Tm−Tc was increased by 1.9° C. relative to LCP-2 alone (CE6). Thus, in general, an improvement in processing window was found for the compositions according to the present disclosure. The processing window (Tm−Tc) was generally observed to increase by 0.1° C. to 3° C. relative to the corresponding comparative composition. The improved processability provided by the compositions of the present disclosure can enable more efficient melt processing of the compositions for use in flexible applications such as wearable devices, flexible circuit boards, flexible displays, and the like.

This disclosure further encompasses the following aspects.

Aspect 1: A composition comprising 55 weight percent to 99.5 weight percent of a liquid crystalline polymer; 0.5 weight percent to 45 weight percent a thermoplastic polymer comprising a polyetherimide, a polyarylate, or a poly (arylene ether-sulfone); wherein weight percent is based on the total weight of the liquid crystalline polymer and the thermoplastic polymer; and 1 part by weight to 60 parts by weight of a compatibilizer comprising a polyepoxy compound or a poly(ester-carbonate), based on the total weight of the thermoplastic polymer.

Aspect 2: The composition of aspect 1, wherein the liquid crystalline polymer is a liquid crystalline polyester derived from an aromatic hydroxycarboxylic acid, an aromatic dicarboxylic acid, an aromatic dihydroxy compound, N-acetyl-para-aminophenol, aminophenol, or a combination thereof; preferably, wherein the liquid crystalline polyester is derived from 4-hydroxybenzoic acid and 6-hydroxy-2-naphthoic acid; or the liquid crystalline polyester is derived from 4-hydroxybenzoic acid, 6-hydroxy-2-naphthoic acid, naphthalene dicarboxylic acid, and hydroquinone.

Aspect 3: The composition of aspect 1 or 2, wherein the thermoplastic polymer comprises the polyetherimide, preferably wherein polyetherimide comprises repeating units derived from bisphenol A dianhydride and m-phenylene diamine.

Aspect 4: The composition of aspect 3, wherein the polyetherimide comprises a poly(etherimide-siloxane) copolymer.

Aspect 5: The composition of aspect 1 or 2, wherein the thermoplastic polymer comprises the polyarylate, preferably wherein the polyarylate is a bisphenol A polyarylate.

Aspect 6: The composition of aspect 1 or 2, wherein the thermoplastic polymer comprises the polysulfone, preferably wherein the poly(arylene ether-sulfone) is a polyethersulfone.

Aspect 7: The composition of any of aspects 1 to 6, wherein the compatibilizer comprises the polyepoxy compound, preferably wherein the polyepoxy compound comprises three or more epoxy groups, and wherein the composition comprises a reaction product of the liquid crystalline polymer, the thermoplastic polymer, and the polyepoxy compound.

Aspect 8: The composition of aspect 7, wherein the polyepoxy compound comprises an addition polymer of an ethylenically unsaturated epoxy compound or an epoxidized novolak resin; preferably wherein the polyepoxy compound comprises repeating units derived from ethylene and glycidyl methacrylate; ethylene, a $C_{1-6}$ alkyl acrylate, and glycidyl acrylate; ethylene, methyl acrylate, and glycidyl acrylate; ethylene, butyl acrylate, and glycidyl acrylate; or ethylene, vinyl acetate, and glycidyl acrylate; more preferably wherein the polyepoxy compound is an ethylene-glycidyl methacrylate copolymer, an ethylene-glycidyl methacrylate-methyl acrylate terpolymer, or an ethylene-glycidyl methacrylate-vinyl acetate terpolymer; even more preferably wherein the polyepoxy compound comprises an ethylene-glycidyl methacrylate copolymer, preferably comprising 1 mole percent to 5 mole percent glycidyl methacrylate groups based on the total moles of the polyepoxy compound.

Aspect 9: The composition of any of aspects 1 to 9, wherein a molded sample of the composition exhibits at least one of: a heat deflection temperature of at least 200° C. as determined according to ASTM D648 at a load of 0.45 MPa; a melting temperature from 260° C. to 350° C. determined by differential scanning calorimetry according to ISO 11357; and a dissipation factor of 0.0005 to 0.005 from 1 GHz to 25 GHz.

Aspect 10: The composition of aspect 1, comprising the reaction product of 85 weight percent to 90 weight percent of the liquid crystalline polymer; 5 weight percent to 15 weight percent of the polyetherimide; and 5 parts by weight to 40 parts by weight of the polyepoxy compound; wherein the liquid crystalline polymer comprises aromatic ester repeating units derived from 4-hydroxybenzoic acid and 6-hydroxy-2-naphthoic acid; the polyetherimide is a polyetherimide homopolymer comprising repeating units derived from bisphenol A dianhydride and m-phenylene diamine; and the polyepoxy compound comprises an ethylene-glycidyl methacrylate copolymer preferably comprising 1 mole percent to 5 mole percent glycidyl methacrylate groups based on the total moles of the polyepoxy compound.

Aspect 11: The composition of aspect 1, comprising a reaction product of 70 weight percent to less than 90 weight percent of the liquid crystalline polymer; 5 weight percent to 25 weight percent of the polyetherimide; and 5 parts by weight to 25 parts by weight of the polyepoxy compound based on the total weight of the polyetherimide; wherein the liquid crystalline polymer comprises aromatic ester repeating units derived from 4-hydroxybenzoic acid and 6-hydroxy-2-naphthoic acid; the polyetherimide is a poly(etherimide-siloxane) copolymer comprising etherimide repeating units derived from bisphenol A dianhydride and m-phenylene diamine and siloxane repeating units derived from dimethylsiloxane; and the polyepoxy compound comprises an ethylene-glycidyl methacrylate copolymer preferably comprising 1 mole percent to 5 mole percent glycidyl methacrylate groups based on the total moles of the polyepoxy compound.

Aspect 12: The composition of aspect 1, comprising the reaction product of 85 weight percent to 95 weight percent of the liquid crystalline polymer; 5 weight percent to 15 weight percent of the polyarylate; and 5 parts by weight to 40 parts by weight of the polyepoxy compound; wherein the liquid crystalline polymer comprises aromatic ester repeating units derived from 4-hydroxybenzoic acid and 6-hydroxy-2-naphthoic acid; the polyarylate is a bisphenol A polyarylate; and the polyepoxy compound comprises an ethylene-glycidyl methacrylate copolymer preferably comprising 1 mole percent to 5 mole percent glycidyl methacrylate groups based on the total moles of the polyepoxy compound.

Aspect 13: The composition of aspect 1, comprising the reaction product of 85 weight percent to 95 weight percent of the liquid crystalline polymer; 5 weight percent to 15 weight percent of the poly(arylene ether-sulfone); and 5 parts by weight to 40 parts by weight of the polyepoxy compound; wherein the liquid crystalline polymer comprises aromatic ester repeating units derived from 4-hydroxybenzoic acid and 6-hydroxy-2-naphthoic acid; the poly(arylene ether-sulfone) is a polyethersulfone; and the polyepoxy compound comprises an ethylene-glycidyl methacrylate copolymer preferably comprising 1 mole percent to 5 mole percent glycidyl methacrylate groups based on the total moles of the polyepoxy compound.

Aspect 14: The composition of any of aspects 10 to 13, wherein a molded sample of the composition exhibits: a heat deflection temperature of at least 205° C., preferably at least 210° C. to 230° C., as determined according to ASTM D648 at a load of 0.45 MPa; a melting temperature from 270° C. to 330° C., preferably 275° C. to 300° C., determined by differential scanning calorimetry according to ISO 11357; and a dissipation factor of 0.0005 to 0.003, preferably of 0.001 to 0.003, at 5 GHz or 20 GHz.

Aspect 15: A method of making the composition of any of aspects 1 to 14, the method comprising melt-mixing the components of the composition, and optionally extruding the composition.

Aspect 16: The method of aspect 15, comprising melt-mixing a liquid crystalline polymer masterbatch comprising: 55 to 70 weight percent of the liquid crystalline polymer; 30 to 45 weight percent of the thermoplastic polymer; wherein weight percent is based on the total amount of the liquid crystalline polymer and the thermoplastic polymer; and 10 to 60 parts by weight of the compatibilizer, based on the total weight of the thermoplastic polymer; and a second amount of the liquid crystalline polymer to provide the composition of any of aspects 1 to 14.

Aspect 17: An article comprising the composition of any of aspects 1 to 14, preferably wherein the article is a component for a consumer electronic device, a lighting component, a display component, or a wire or cable component.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. “Combinations” is inclusive of blends, mixtures, alloys, reaction products, and the like. The terms “first,” “second,” and the like, do not denote any order, quantity, or importance, but rather are used to distinguish one element from another. The terms “a” and “an” and “the” do not denote a limitation of quantity, and are to be construed to cover both the singular and the plural, unless otherwise indicated herein or clearly contradicted by context. “Or” means “and/or” unless clearly stated otherwise. Reference throughout the specification to “an aspect” means that a particular element described in connection with the aspect is included in at least one aspect described herein, and may or may not be present in other aspects. The term “combination thereof” as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash (“-”) that is not between two letters or symbols is used to indicate a point of attachment for a substituent. For example, —CHO is attached through carbon of the carbonyl group.

As used herein, the term “hydrocarbyl”, whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($—NO_2$), a cyano (—CN), a $C_{1-6}$ alkyl sulfonyl ($—S({=}O)_2$-alkyl), a $C_{6-12}$ aryl sulfonyl ($—S({=}O)_2$-aryl), a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising 55 weight percent to 99.5 weight percent of a liquid crystalline polymer;

0.5 weight percent to 45 weight percent a thermoplastic polymer comprising a poly(arylene ether-sulfone);

wherein weight percent is based on the total weight of the liquid crystalline polymer and the thermoplastic polymer; and 1 part by weight to 60 parts by weight of a compatibilizer comprising a polyepoxy compound or a poly(ester-carbonate), based on the total weight of the thermoplastic polymer.

2. The composition of claim 1, wherein the liquid crystalline polymer is a liquid crystalline polyester derived from an aromatic hydroxycarboxylic acid, an aromatic dicarboxylic acid, an aromatic dihydroxy compound, N-acetyl-para-aminophenol, aminophenol, or a combination thereof.

3. The composition of claim 1, wherein the compatibilizer comprises the polyepoxy compound.

4. The composition of claim 3, wherein the polyepoxy compound comprises an addition polymer of an ethylenically unsaturated epoxy compound or an epoxidized novolak resin.

5. The composition of claim 1, comprising a reaction product of 85 weight percent to 95 weight percent of the liquid crystalline polymer;

5 weight percent to 15 weight percent of the poly(arylene ether-sulfone); and 5 parts by weight to 40 parts by weight of the polyepoxy compound based on the total weight of the poly(arylene ether-sulfone);

wherein the liquid crystalline polymer comprises aromatic ester repeating units derived from 4-hydroxybenzoic acid and 6-hydroxy-2-naphthoic acid; and the polyepoxy compound comprises an ethylene-glycidyl methacrylate copolymer.

6. A method of making the composition of claim 1, the method comprising melt-mixing the components of the composition, and optionally extruding the composition.

7. The method of claim 6, comprising melt-mixing a liquid crystalline polymer masterbatch comprising:

55 to 70 weight percent of the liquid crystalline polymer;

30 to 45 weight percent of the thermoplastic polymer;

wherein weight percent is based on the total amount of the liquid crystalline polymer and the thermoplastic polymer; and 10 to 60 parts by weight of the compatibilizer, based on the total weight of the thermoplastic polymer; and a second amount of the liquid crystalline polymer to provide the composition of claim 1.

8. An article comprising the composition of claim 1.

9. The composition of claim 1, wherein the composition comprises 65 weight percent to 99.5 weight percent of the liquid crystalline polymer.

* * * * *